Figure 4:
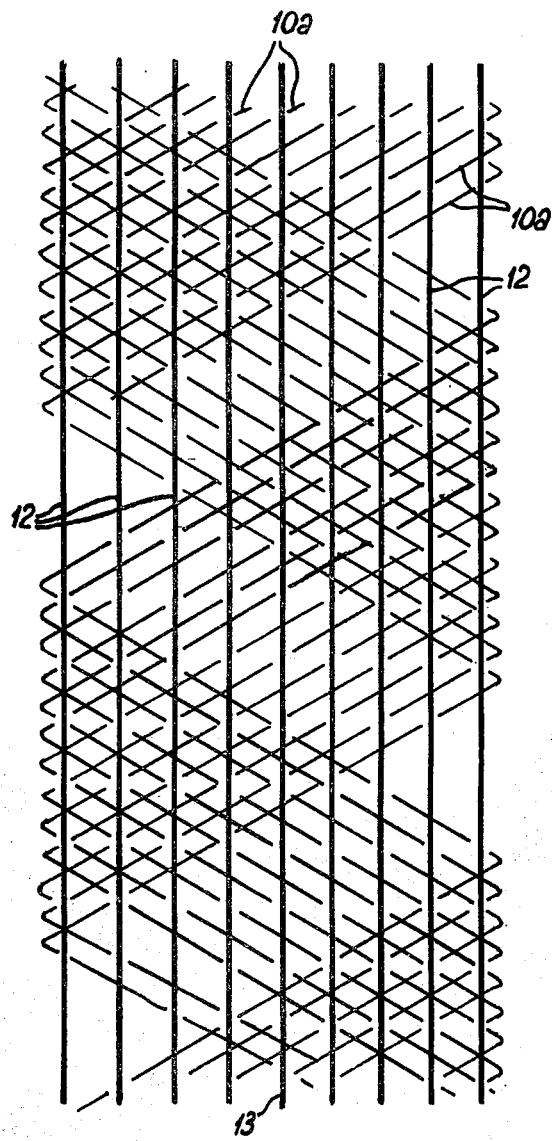

United States Patent [19]

Makin

[11] 4,070,911
[45] Jan. 31, 1978

[54] BRAIDED TAPE INCLUDING CARRIER MEANS

[75] Inventor: Ronay Denton Makin, Stockport, England

[73] Assignee: Thomas French and Sons (Electrical) Limited, England

[21] Appl. No.: 593,375

[22] Filed: July 7, 1975

[30] Foreign Application Priority Data

July 5, 1974 United Kingdom ............... 29832/74

[51] Int. Cl.² ............................................... G01K 1/00
[52] U.S. Cl. ............................ 73/343 R; 174/117 F; 87/5
[58] Field of Search ...................... 73/341, 342, 343 R; 174/115, 117 F, 117 FF, 117 M, 70 R; 350/96 B, 96 BC; 138/111, 112, 123-125; 338/25, 26, 28; 340/227 C; 87/5, 7

[56] References Cited

U.S. PATENT DOCUMENTS

| 231,176 | 8/1880 | Kohn | 87/7 |
|---|---|---|---|
| 272,441 | 2/1883 | Hunter | 174/117 M X |
| 362,010 | 4/1887 | Jewill | 174/117 M X |
| 2,100,543 | 11/1937 | Hamilton | 87/5 |
| 2,315,837 | 4/1943 | Brown et al. | 87/7 |
| 2,842,648 | 7/1958 | Reynolds | 338/26 |
| 3,257,500 | 6/1966 | Rusch et al. | 174/114. F X |
| 3,421,405 | 1/1969 | Loggippo | 87/7 |
| 3,473,872 | 10/1969 | Okamura | 350/96 BC X |
| 3,505,046 | 4/1970 | Phaneuf | 350/96 CB X |
| 3,660,590 | 5/1972 | Conant | 174/70 R X |
| 3,688,581 | 9/1972 | LeQuernec | 73/362 AR |
| 3,766,307 | 10/1973 | Andrews | 174/115 X |

FOREIGN PATENT DOCUMENTS

| 15,056 of | 1887 | United Kingdom | 174/117 M |
| 550,049 | 12/1942 | United Kingdom | 138/111 |

Primary Examiner—Donald O. Woodiel
Attorney, Agent, or Firm—James E. Nilles

[57] ABSTRACT

Tape which is formed of generally flat construction and by braiding and which includes carrier means for electricity, light or fluid. The carrier means is contained between the yarn from which the braid is produced. The yarn may be formed from metallic, glass fiber, plastics or the like and of natural, synthetic or regenerated fibers. The carrier means comprises insulated electrical resistance or conductor wires or a combination thereof or may consist of fiber optic materials or a fluidic tube.

6 Claims, 7 Drawing Figures

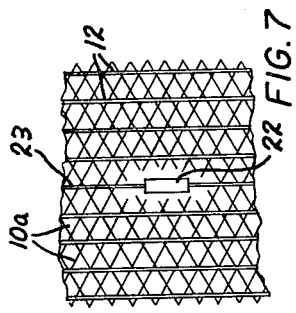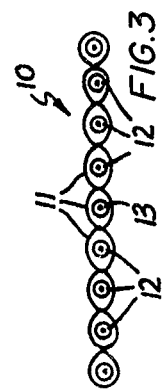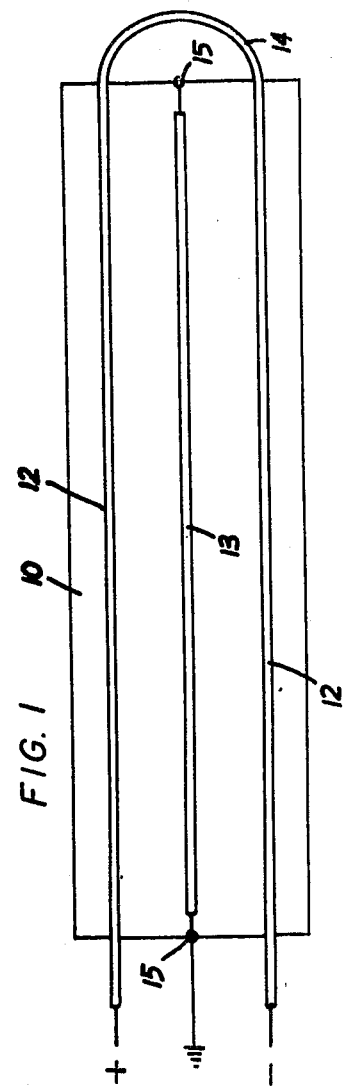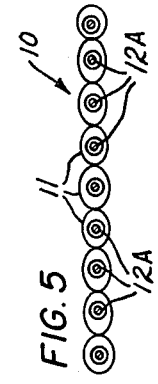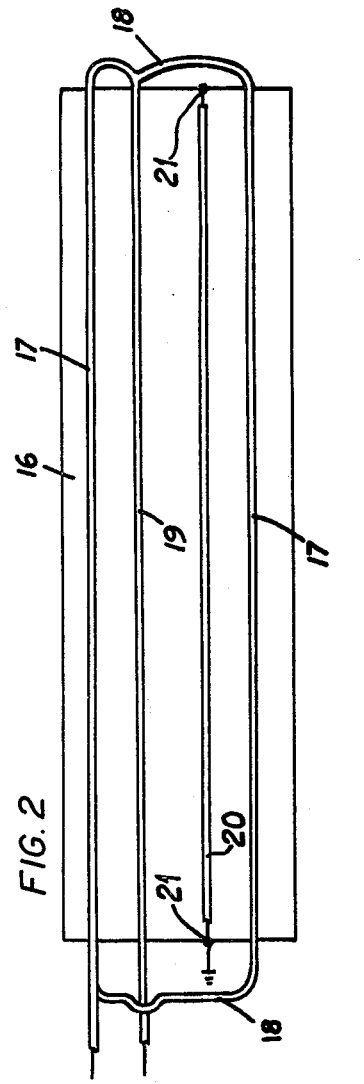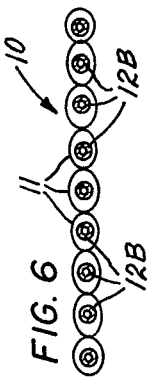

BRAIDED TAPE INCLUDING CARRIER MEANS

This invention concerns tapes and in particular tapes incorporating electrical conductor or resistance elements or both, and tapes incorporating fibre optics elements of fluidics tubes Insofar as tapes incorporating electrical conductor and/or resistance elements are concerned it is known to weave such tapes using natural, regenerated or synthetic fibre yarn and to incorporate the conductor and/or resistance element or elements during or after weaving in warpwise oriented tube formations formed in the tape during weaving.

A woven tape incorporating one or more conductors or resistance wires is a relatively complex structure and can, due to loom stresses, only be produced at relatively low speed. It is also to be borne in mind that when stiff elements are to be incorporated in the woven structure as it is being woven difficulties are experienced in introducing the elements without imparting strain and in some instances due to the stiffness of the elements they cannot be introduced into a woven structure during weaving because undue strain would be imparted. The strain imparted results, to some extent, from the fact that the tape as it is being woven is passed between and around small diameter rollers or guides in the looms.

For some electrical uses tape including conductors or resistance wires must be provided with an external braided metal wire sheath which is usually applied to the tape after the latter has been woven. In such a tape the braid can, if desired, be used as an earth continuity conductor. One of the disadvantages of sheathing a tape lies in the fact that it is difficult to draw long lengths of tape into the sheath and thus, if long tapes are required junction boxes which provide joints are necessary at frequent intervals along the tape.

As is known different tapes are required for different uses and thus a manufacturer must make a variety of different types of tape if he is to be able to meet all requirements. It is also known that the cost of braiding is high, particularly for short runs and thus it is convenient to produce the tape and braid separately, and then assemble the tape and braid, the production process is, therefore, complex, expensive and time consuming. Furthermore, the product, however much the tubular braid is flattened, is still a multiply structure and is thus, in some cases, difficult to use due to its stiffness. It is to be appreciated that over braiding a tape is possible but for this to be commercially viable very long runs are required and in many cases the user will require a variety of types of tape and thus the process is only rarely usable.

Another disadvantage of conventional braided units lies in the fact that there is tendency for the wires to twist or roll inside the braid and thus it is not always possible to ensure a permanent lay-flat formation with good separation of the conductor and/or resistance elements contained within the tape.

It is an object of the present invention to provide a tape which is versatile with regard to the uses to which it can be put and which is relatively simple to manufacture, and can be produced in a single manufacturing operation.

Thus according to the present invention a tape comprises a braid of flat construction including carrier means for electricity, light or fluid contained between the yarns from which the braid is produced.

In one form the braid contains a plurality of parallel spaced-apart resistance or conductor elements adapted to be series or parallel connected, some at least of the material of the braid being electrically conductive whereby the braid is usable as an earth continuity conductor.

The invention will now be described further, by way of example only, with reference to the accompanying diagrammatic drawings in which:

FIG. 1 is a diagrammatic illustration of a tape made in accordance with one embodiment of the invention, some of the wires of the tape being omitted for clarity, FIG. 2 is a diagrammatic illustation of a second embodiment of the invention, FIG. 3 is a diagrammatic sectional view of a flat braided tape made in accordance with the invention, FIG. 4 is an enlarged diagrammatic illustration of one form of braid, some of the braiding elements being omitted for clarity, FIG. 5 is a view similar to FIG. 3 but showing fibre optic elements instead of wires, FIG. 6 is a view similar to FIG. 3 but showing tubes for conducting fluids, and FIG. 7 is a portion of a tape similar to that shown in FIG. 4 but including a sensing element in circuit with one of the electrical conductors.

In the following description reference will be made to the production of a tape in which insulated resistance wires are provided, the tape being braided using a plurality of braiding yarns as defined below which in this specific embodiment are electrically conductive wires. It should be borne in mind that the braiding elements may be natural, synthetic or regenerated material yarns or narrow strips of material such as plastics material, foil or fibrous material. For the sake of simplicity, these materials are all referred to in this specification as 'yarn' except where the context requires specific reference to the material of the yarn.

As shown in FIG. 1 there is provided a braided tape 10 of flat form as shown in FIGS. 3 and 4. The tape is produced upon a standard flat braiding machine using eighteen wires 10a braided together in known manner effectively to produce tubes 11 extending along the length of the tape (see FIG. 3). During braiding insulated wires 12 are fed to the machine so that as braiding proceeds the insulated wires 12 are enwrapped by the wire being braided. As shown in FIGS. 3 and 4 there are eight wires 12 which are resistance wires and these are located four at each side of a wire 13 which is a conductor wire, this latter being located approximately midway between the edges of the braid. Subsequent to the production of the braided tape and as illustrated diagrammatically in FIG. 1 (in which only two wires 12 are shown for the sake of convenience) the wires 12 are joined together at one end of the tape 10 by a connection wire 14 and the wire 13 is connected to each end of the braid as indicated by the reference numeral 15. This latter wire 13, when the tape is in use, serves together with the metallic yarn braid, as an earth continuity lead and the wires 12, which are series connected by the connection wire 14 are themselves connectable to a source of power.

Referring to the arrangement shown in FIG. 2 there is provided a braided tape 16, constructed in the same manner as the braid 10, in which wires are located, during braiding, into four spaced apart tubes of the braid. In this tape the outermost wires 17 are resistance wires which after production of the tape are connected to each other at each end of the tape 16 by connector wires 18 and at one end of the tape only are also connected to one of the other two wires, for example, wire 19. This arrangement provides a parallel resistance arrangement. The fourth wire 20 is connected to each end of the tape shown at 21 and this wire serves with the braid as an earth continuity lead.

The tape of FIG. 2 as compared to the tape of FIG. 1 can, due to the parallel arrangement of resistance wires 17, be produced in longer lengths than a braided tape of the kind shown in FIG. 1 whilst still only requiring the same voltage for any given heating effect. Alternatively if produced to the same length as the tape of FIG. 1 will require lower voltage to achieve the same heating effect.

Whilst reference has been made above to the braiding of metallic wires and the incorporation of resistance wires to produce an electrical resistance tape it is possible to produce a conductor element in any one of the forms described and of course electrical tapes may be produced with a different number of resistance or conductor wires than have been referred to above.

It is also possible to produce a braided tape incorporating fibre optics 12A as shown in FIG. 5 as opposed to the resistance or conductor wires referred to above, or, in fact, to incorporate fluidics tubes 12B as shown in FIG. 6 into the tape instead of wires or fibre optics.

Additionally it is possible to produce a tape in which resistance and/or conductor wires are carried together with fibre optics or fluidics tubes or both if desired.

For some uses the tape may be braided using, for example, glass fibre yarns as opposed to wire, in this case if the tape is for electrical use one or more earth continuity leads must be provided.

In any form of tape referred to above in which it is necessary to be able to control or check temperatures along the tape, thermostats or temperature sensors can be incorporated into the braided tape. FIG. 7 shows a tape wherein a sensor 22 is connected in circuit with, for example, a conductor wire 23 which transmits signal information regarding the temperature of the tape.

It is thought that by using a tape of the kind described above in which there are electrical resistance elements carried in a metallic wire braid a high rate of heat diffusion from the elements can be achieved since there is only metallic braid surrounding the resistance elements, in addition, since the resistance elements are each covered to substantially the same extent by the braiding wires, there will be uniform thermal conductivity along the length of the tape. In fact, the temperature characteristics of the tape will be uniform over each element since the braiding covers each element to the same, or substantially the same extent.

Since the tape is produced solely by the introduction of the electrical or other elements during braiding the production process is relatively simple and there is no restriction upon the length of tape that can be produced. Production costs are, therefore, expected to be such that the tape will be commercially viable for many uses, both where it has not hitherto been essential to provide a braided metallic sheath over a woven tape, and, of course, where such a sheathed tape has hitherto been essential.

Since the tape is produced by a braiding process during which it is not necessary to pass the tape around small diameter rollers or the like (as in the case when weaving a textile tape) strong relatively stiff reinforcement wire can be incorporated in some of the tapes of the braid to give the tape a high tensile strength.

The tape can, because it is of single thickness, and because the strands of the braiding material cross each other between the elements contained therein, be easily flexed transversely, the crossed braiding strands forming, if effect, hinge lines between the elements contained longitudinally therein and preventing the elements from rolling or twisting within the braid.

Braided tapes of the kinds referred to above can be made with the braiding yarns densely packed, for uses in which the tape is required to have high mechanical strength, or with the braiding yarns less densely packed, thereby in effect producing an open lattice braid where tape strength requirements are relatively low. For example, a mechanically strong tape can be used in locations wherein the tape may be subjected accidentally from time to time to heavy blows. The material of the braiding yarns chosen will depend upon the intended location of the tape and the use to which the tape is to be put. For example, tapes may be required in locations in which there is a corrosive atmosphere wherein metallic braiding yarns would be adversely affected, in this case plastics or glass fibre yarns could be used. Similarly if the tape is to be used in a location subjected to substantial variations in temperature and/or humidity, it will be possible to select braiding yarns that will withstand these changes without being adversely affected. In addition, in conditions in which a high degree of thermal dissipation is required or where a high watts density is called for, it is possible to select the most suitable braiding yarn and conductor or resistance wire combination.

A typical braided tape construction may be such as to result in the tape being 20 m.m. wide with 24 conductor or resistance wires contained therein. In this tape there would be 12 braiding ends per conductor and the braid would have a 34° braid angle with a 2 over and a 2 under weave. In such a tape the electrical conductor or resistance elements may consist of uninsulated tinned copper wire of 0.2 m.m. diameter.

I claim:

1. A tape comprising a single thickness braid of flat construction formed of yarns and carrier means for transmission of energy contained between the yarns from which the braid is produced, said carrier means comprising fibre optics material for transmitting light.

2. A tape comprising a single thickness braid of flat construction formed of yarns and a plurality of carrier means for transmission of energy contained between the yarns from which the braid is produced, at least two of which carrier means are series connected electrical conductors and in which at least one other of the carrier means serves as an earth continuity lead.

3. A tape as claimed in CLAIM 2 in which at least some of the braiding yarns are electrically conductive.

4. A tape comprising a single thickness braid of flat construction formed of yarns and a plurality of carrier means for transmission of energy contained between the yarns from which the braid is produced, at least two of which carrier means are parallel connected electrical conductors and in which at least one other of the carrier means serves as an earth continuity lead.

5. A tape as claimed in CLAIM 4 in which at least some of the braiding yarns are electrically conductive.

6. A tape comprising a single thickness braid of flat construction formed of yarns and carrier means for transmission of energy contained between the yarns from which the braid is produced, in which a temperature sensor is incorporated in the tape.

* * * * *